(12) United States Patent
Moskowitz et al.

(10) Patent No.: US 7,152,162 B2
(45) Date of Patent: *Dec. 19, 2006

(54) Z-TRANSFORM IMPLEMENTATION OF DIGITAL WATERMARKS

(75) Inventors: Scott A. Moskowitz, Miami, FL (US); Marc Cooperman, New York, NY (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/026,234

(22) Filed: Dec. 30, 2004

(65) Prior Publication Data

US 2005/0135615 A1 Jun. 23, 2005

Related U.S. Application Data

(60) Continuation of application No. 09/456,319, filed on Dec. 8, 1999, now Pat. No. 6,853,726, which is a division of application No. 08/772,222, filed on Dec. 20, 1996, now Pat. No. 6,078,664.

(51) Int. Cl.
*H04L 9/00* (2006.01)

(52) U.S. Cl. ..................................................... 713/176

(58) Field of Classification Search ...................... None
See application file for complete search history.

(56) References Cited

U.S. PATENT DOCUMENTS

| | | | |
|---|---|---|---|
| 3,984,624 A | 10/1976 | Waggener | |
| 3,986,624 A | 10/1976 | Cates, Jr. et al. | |
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 4,528,588 A | 7/1985 | Lofberg | |
| 4,672,605 A | 6/1987 | Hustig et al. | |
| 4,729,112 A | 3/1988 | Millar | |
| 4,748,668 A | 5/1988 | Shamir et al. | |
| 4,797,423 A | 1/1989 | Benanti | |
| 4,876,617 A | 10/1989 | Best et al. | |
| 4,908,873 A | 3/1990 | Philibert et al. | |
| 4,939,515 A | 7/1990 | Adelson | |
| 4,972,471 A | 11/1990 | Gross et al. | |
| 4,979,210 A | 12/1990 | Nagata et al. | |
| 4,980,782 A | 12/1990 | Ginkel | |
| 5,073,925 A | 12/1991 | Nagata et al. | |
| 5,113,437 A | 5/1992 | Best et al. | |
| 5,161,210 A | 11/1992 | Druyvesteyn et al. | |
| 5,243,423 A | 9/1993 | DeJean et al. | |
| 5,287,407 A | 2/1994 | Holmes | |
| 5,319,735 A | 6/1994 | Preuss et al. | |
| 5,363,448 A | 11/1994 | Koopman, Jr. et al. | |
| 5,365,586 A | 11/1994 | Indeck et al. | |
| 5,379,345 A | 1/1995 | Greenberg | |
| 5,412,718 A | 5/1995 | Narashimhalu et al. | |
| 5,428,606 A | 6/1995 | Moskowitz | |
| 5,448,206 A | 9/1995 | Newhall | |
| 5,450,490 A | 9/1995 | Jensen et al. | |
| 5,493,677 A | 2/1996 | Balogh et al. | |
| 5,506,795 A | 4/1996 | Yamakawa | |
| 5,522,012 A | 5/1996 | Mammone et al. | |
| 5,530,751 A | 6/1996 | Morris | |
| 5,530,759 A | 6/1996 | Braudaway et al. | |
| 5,568,570 A | 10/1996 | Rabbanl | |
| 5,570,305 A | 10/1996 | Fattouche et al. | |
| 5,579,124 A | 11/1996 | Aijala et al. | |
| 5,583,488 A | 12/1996 | Sala et al. | |
| 5,613,004 A | 3/1997 | Cooperman et al. | |
| 5,617,119 A | 4/1997 | Briggs et al. | |
| 5,636,292 A | 6/1997 | Rhoads | |
| 5,646,997 A | 7/1997 | Barton | |
| 5,664,018 A | 9/1997 | Leighton | |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,721,788 A | 2/1998 | Powell et al. | |
| 5,740,244 A | 4/1998 | Indeck et al. | |
| 5,745,569 A | 4/1998 | Indeck et al. | |
| 5,748,783 A | 5/1998 | Rhoads | |
| 5,751,811 A | 5/1998 | Magnotti et al. | |

(Continued)

FOREIGN PATENT DOCUMENTS

EP 0565947 A1 10/1993

(Continued)

OTHER PUBLICATIONS van Schyndel et al., A digital Watermark, IEEE International Computer Processing Conference, Austin, Texas, Nov. 13-16, 1994, pp. 86-90.

(Continued)

*Primary Examiner*—Kambiz Zand
*Assistant Examiner*—Benjamin E. Lanier

(57) ABSTRACT

Z-transform calculations may be used to encode (and/or decode) carrier signal independent data (e.g., digital watermarks) to a digital sample stream. Deterministic and non-deterministic components of a digital sample stream signal may be analyzed for the purposes of encoding carrier signal independent data to the digital sample stream. The carrier signal independent data may be encoded in a manner such that it is restricted or concentrated primarily in the non-deterministic signal components of the carrier signal. The signal components can include a discrete series of digital samples and/or a discreet series of carrier frequency sub-bands of the carrier signal. Z-transform calculations may be used to measure a desirability of particular locations and a sample stream in which to encode the carrier signal independent data.

20 Claims, No Drawings

U.S. PATENT DOCUMENTS

| | | | |
|---|---|---|---|
| 5,757,923 | A | 5/1998 | Koopman, Jr. |
| 5,774,452 | A | 6/1998 | Wolosewicz |
| 5,828,325 | A | 10/1998 | Wolosewicz et al. |
| 5,832,119 | A | 11/1998 | Rhoads |
| 5,859,920 | A | 1/1999 | Daly et al. |
| 5,889,868 | A | 3/1999 | Moskowitz et al. |
| 5,893,067 | A | 4/1999 | Bender et al. |
| 5,912,972 | A | 6/1999 | Barton |
| 5,930,377 | A | 7/1999 | Powell et al. |
| 6,078,664 | A | 6/2000 | Moskowitz et al. |
| 6,208,745 | B1 | 3/2001 | Florencio et al. |
| 6,285,775 | B1 | 9/2001 | Wu et al. |
| 6,330,335 | B1 | 12/2001 | Rhoads |
| 6,330,672 | B1 | 12/2001 | Shur |

FOREIGN PATENT DOCUMENTS

| | | |
|---|---|---|
| EP | 0581317 A2 | 2/1994 |
| WO | WO 95/14289 | 5/1995 |

OTHER PUBLICATIONS

Smith et al., Modulation and Information Hiding in Images, Springer Verlag, First International Workshop, Cambridge, U.S., May 30-Jun. 1, 1996, pp. 207-227.
Kutter, Martin et al., Digital Signature of Color Images Using Amplitude Modulation, SPIE-E197, vol. 3022, pp. 518-227.
Puate, Joan et al., Using Fractal Compression Scheme to Embed a Digital Signature into an Image, SPIE-96 Proceedings, vol. 2915, Mar. 1997, pp. 108-118.
Swanson, Mitchell, D. et al., Transparent Robust Image Watermarking, Proc. of the 1996 IEEE Int'l. Conf. on Image Processing, vol. III, 1996, pp. 211-214.
Swanson, Mitchell, D. et al., Robust Data Hidting for Images, 7th IEEE Digital Signal Processing workshop, Leon, Norway, Sep. 1-4, 1996, pp. 37-40.
Zhao, Jian et al., Embedding Robust Labels into Images for Copyright Protection, Proceedings of the KnowRight'95 Conference, pp. 242-251.
Koch, E., et al., Towards Robust and Hidden Image Copyright Labeling, 1995 IEEE Workshop on Nonlinear Signal and Image Processing, Jun. 1995, Neos Marmaras, pp. 4.
van Schyndel et al., Towards a Robust Digital Watermark, Second Asian Image Processing Conference, Dec. 6-8, 1995, Singapore, vol. 2, pp. 504-508.
Tirkel, A.Z., A Two-Dimensional Digital Watermark, DICTA'95, University of Queensland, Brisbane, Dec. 5-8, 1995, pp. 7.
Tirkel, A.Z., Image Watermarking—A Spread Spectrum Application, ISSSTA '96, Sep. 1996, Malnz German, pp. 6.
Ruanaldh et al., Watermarking digital Images for copyright protection, IEE Proceedings, vol. 143, No. 4, Aug. 1996, pp. 250-258.
Cox et al., Secure Spread Spectrum Watermarking for Multimedia, NEC Research Institute, Technical Report 95-10, pp. 33.
Kahn, D., The Code Breakers, The Macmillan Company, 1963, pp. xiii, 81-83, 513, 515, 522-526, 883.
Boney et al., Digital Watermarks for Audio Signals, EUSIPCO 96, pp. 473-480.
Dept of Electrical Engineering. Delft University of Technology. Delft, The Netherlands G.C. Langelaar et al., "Copy Protection for Multimedia Data based on Labeling Tecniques" Jul. 1996 9 pp.
F. Hartuag et al., Digital Watermarking of Raw and Compressed Video, SPIE vol. 2952, pp. 205-213.
Craver et al., "Can Invisble Watermarks Resolve Rightful ownerships?", IBM Research Report, RC 20509 (Jul. 25, 1996) 21 pp.
Press et al., "Numerical Recipes in C", Cambridge Unvi. Press, 1988, pp. 398-417.
Pohlmann, Ken C., "Principles of Digital Audio", 3$^{rd}$ Ed., 1995, pp. 32-37, 40-48, 138, 147-149, 332, 333, 364, 499-501, 508-509, 564-571.
Pohlmann, Ken C., "Principles of Digital Audio", 2$^{nd}$ Ed., 1991, pp. 1-9, 19-25, 30-33, 41-48, 54-57, 86-107, 375-387.
Schneier, Bruce, "Applied Cryptography", John Wiley & Sons, Inc., New York, 1994 pp. 68-65, 387-392, 1-57, 273-275, 321-324.
1996 IEEE Int. Conf. on Multimedia Computing and Systems, Jun. 17-23, Hiroshima, Japan, Laurence Boney et al.: Digital Watermarks for Audio Signals, pp. 473-480.
Schneier, Bruce, *Applied Cryptography*, 2$^{nd}$ Ed., John Wiley & Sons, pp. 9-10, 1996.
Menezes, Alfred J., *Handbook of Applied Cryptography*, CRC Press, p. 46, 1997.
Merriam-Webster's Collegiate Dictionary, 10$^{th}$ Ed., Merriam Webster, Inc., p. 207.
Grealy , et al., *Principles of Corporate Finance*, "Appendix A—Using Option Valuation Medals", 1984, pp. 448-449.
Copeland, et al., *Real Options: A Practioners Guide*, 2001 pp. 106-107, 201-202, 204-208.
Sarkar M. "An Assessment of Pricing Mechanisms for the Interact—A Regulatory Imperative", presented MIT Workshop on Internet Economics, Mar. 1995, http://www.press.umich.edu/jep/works/SarkAssess.html on Mar. 12, 1995.
Crawford, D.W. "Pricing Network Usage: A Market For Bandwidth of Market Communication?"presented MIT Workshop on Internet Economics, Mar. 1995 http://www.press.umich.edu/jep/works/CrawMarket.html on Mar. 12, 1995.
Low, S.H., "Equilibrium Allocation and Pricing of Variable Resources Among User-Suppliers", 1988. http://www.citeseer.nj.nec.com/366503.html.
Caronni, Germano, "Assuring Ownership Rights For Digital Images", published Proceedings of Reliable IT Systems VIS '95, H.H. Bruggemann and W. Gerhardt-Hackel (Ed.), Vieweg Publishing Company, Germany, 1995.
Zhao, Jian. "A WWW Service to Embed and Prove Digital Copyright Watermarks", Proc. of the European Conf. on Multimedia Application, Services & Techniques Louvain-La-Neuve, Belgium May 1996.
Gruhl, Daniel et al., *Echo Hiding*. In Proceeding of the Workshop on Information Hiding, No. 1174 in Lecture Notes in Computer Science, Cambridge, England (May/Jun. 1996).
Domen, A.W.J. et al., *A Variable Bit Rate Buried Data Channel For Compact Disc*, J. Audio Eng. Soc., vol. 43, No. 1/2, pp. 23-28 (1995).
Ten Kate, W. et al., *A New Surround—Stereo—Surround Coding Techniques*, J. Audio Eng. Soc., vol. 40, No. 5, pp. 376-383 (1992).
Gerzon, Michael et al., *A High Rate Buried Data Channel for Audio CD*, presentation notes, Audio Engineering Soc. 94$^{th}$ Convention (1993).
Sklar, Bernard, *Digital Communications*, pp. 601-603 (1988).
Jayant, N.S. et al., *Digital Coding of Waveforms*, Prentice Hall Inc., Englewood Cliffs, NJ, pp. 486-509 (1984).
Bender, Walter R. et al, *Techniques For Data Hiding*, SPIE Int. Soc. Opt. Eng., vol. 2420, 164-173, 1995.
Zhao, Jian et al., *Embedding Robust Lables Into Images For Copyright Protection*, (XP 000571967), pp. 242-251, 1995.
Menezes, Alfred J., *Handbook of Applied Cryptography*, CRC Press, p. 175, 1997.
Schneier, Bruce , *Applied Cryptography*, 1$^{st}$ Ed., pp. 67-68, 1994.
Ten Kate, W. et al., "Digital Audio Carrying Extra Information", IEEE, CH2847-2/90/0000-1097, (1990).

Z-TRANSFORM IMPLEMENTATION OF DIGITAL WATERMARKS

CROSS REFERENCE TO RELATED APPLICATIONS

This application is a continuation of U.S. patent application Ser. No. 09/456,319, filed Dec. 8, 1999, now U.S. Pat. No. 6,853,726 which is a division of U.S. patent application Ser. No. 08/772,222, filed Dec. 20, 1996, now U.S. Pat. No. 6,078,664. The previously identified patents and/or patent applications are hereby incorporated by reference, in their entireties.

BACKGROUND OF THE INVENTION

Digital distribution of multimedia content (audio, video, etc.) and the impending convergence of industries that seek to make this goal a reality (computer, telecommunications, media, electric power, etc.) collide with the simplicity of making perfect digital copies. There exists a vacuum in which content creators resist shifts to full digital distribution systems for their digitized works, due to the lack of a means to protect the copyrights of these works. In order to make such copyright protection possible, there must exist a mechanism to differentiate between a master and any of its derivative copies. The advent of digital watermarks makes such differentiation possible. With differentiation, assigning responsibility for copies as they are distributed can assist in the support and protection of underlying copyrights and other "neighboring rights," as well as, the implementation of secure metering, marketing, and other as yet still undecided applications. Schemes that promote encryption, cryptographic containers, closed systems, and the like attempt to shift control of copyrights from their owners to third parties, requiring escrow of masters and payment for analysis of suspect, pirated copies. A frame-based, master-independent, multi-channel watermark system is disclosed in U.S. patent application Ser. No. 08/489,172 filed on Jun. 7, 1995 and entitled "STEGANOGRAPHIC METHOD AND DEVICE", U.S. patent application Ser. No. 08/587,944 filed on Jan. 17, 1996 and entitled "METHOD FOR HUMAN-ASSISTED RANDOM KEY GENERATION AND APPLICATION FOR DIGITAL WATERMARK SYSTEM", and U.S. patent application Ser. No. 08/587,943 filed on Jan. 16. 1996 and entitled "METHOD FOR STEGA-CIPHER PROTECTION OF COMPUTER CODE". These applications describe methods by which copyright holders can watermark and maintain control over their own content. Any suspect copies carry all necessary copyright or other "rights" information within the digitized signal and possession of an authorized "key" and the software (or even hardware) described in these applications would make determination of ownership or other important issues a simple operation for the rights holder or enforcer.

Optimizing watermark insertion into a given signal is further described in the U.S. patent application Ser. No. 08/677,435 filed on Jul. 2, 1996 and entitled "OPTIMIZATION METHODS FOR THE INSERTION, PROJECTION AND DETECTION OF DIGITAL WATERMARKS IN DIGITIZED DATA". This application discloses accounting for the wide range of digitally-sampled signals including audio, video, and derivations thereof that may constitute a "multimedia" signal. The optimization techniques described in that application take into account the two components of all digitization systems: error coding and digital filters. The premise is to provide a better framework or definition of the actual "aesthetic" that comprises the signal being reproduced, whether through commercial standards of output (NTSC, CD-quality audio, etc.) or lossless and lossy compression (MPEG-2, Perceptual Audio Coding, AC-3, Linear Adaptive Coding, and the like), so that a watermark may be targeted at precisely the part of the signal comprising such an "aesthetic" in order that it be as robust as possible (i.e., difficult to remove without damaging the perceptual quality of the signal). However the content is stored, the signal still carries the digital watermark. Additionally, transmission media may be characterized as a set of "filters" that may be pre-analyzed to determine the best "areas" of the signal in which watermarks "should" be encoded, to preserve watermarks in derivative copies and ensure maximum destruction of the main, carrier signal when attempts are made to erase or alter the watermarked content.

Optimal planning of digital watermark insertion can be based on the inversion of digital filters to establish or map areas comprising a given content signal's "insertion envelope." That is, the results of the filter operation are considered in order to "back out" a solution. In the context of this discussion, the phrase "inverting" a filter may mean, alternatively, mathematical inversion, or the normal computation of the filter to observe what its effect would be, were that filter applied at a later time. Planning operations will vary for given digitized content: audio, video, multimedia, etc. Planning will also vary depending on where a given "watermarker" is in the distribution chain and what particular information needs that user has in encoding a given set of information fields into the underlying content. The disclosures described take into account discrete-time signal processing which can be accomplished with Fast Fourier Transforms that are well-known in the art of digital signal processing. Signal characteristics are also deemed important: a specific method for analysis of such characteristics and subsequent digital watermarking is disclosed in further detail in this application. The antecedents of the present invention cover time and frequency domain processing, which can be used to examine signal characteristics and make modifications to the signal. A third way would be to process with z-transforms that can establish signal characteristics in a very precise manner over discrete instances of time. In particular, z-transform calculations can be used to separate the deterministic, or readily predictable, components of a signal from the non-deterministic (unpredictable or random) components. It should be apparent to those skilled in the art that non-deterministic is a subjective term whose interpretation is implicitly affected by processing power, memory, and time restrictions. With unlimited DSP (digital signal processing) power, memory, and time to process, we might theoretically predict every component of a signal. However, practicality imposes limitations. The results of the z-transform calculations will yield an estimator of the signal in the form of a deterministic approximation. The difference between a signal reconstituted from the deterministic estimator and the real signal can be referred to as error, and the error in an estimator can be further analyzed for statistical characteristics. Those skilled in the art will be aware that Linear Predictive Coding (LPC) techniques make use of these properties. So the error can be modeled, but is difficult to reproduce exactly from compressed representations. In essence, this error represents the randomness in a signal which is hard to compress or reproduce, but in fact may contribute significantly to the gestalt perception of the signal.

The more elements of error determined with z-transforms, the better able a party is at determining just what parts of a given carrier signal are deterministic, and thus predictable, and what elements are random. The less predictable the watermark-bearing portion of a signal is and the more it contributes to the perception of the signal, as previously disclosed, the more secure a digital watermark can be made. Z-transform analysis would disclose just which phase components are deterministic and which are random. This is because it is difficult to compress or otherwise remove unpredictable signal components. Error analysis further describes the existence of error function components and would reliably predict what signals or data may later be removed by additional z-transform analysis or other compression techniques. In effect, the error analysis indicates how good an approximation can be made, another way of stating how predictable a signal is, and by implication, how much randomness it contains. Z-transforms are thus a specialized means to optimize watermark insertion and maximize the resulting security of encoded data from attempts at tampering The results of a Z-transform of input samples could be analyzed to see "exactly" how they approximate the signal, and how much room there is for encoding watermarks in a manner that they will not be removed by compression techniques which preserve a high degree of reproduction quality.

Time is typically described as a single independent variable in signal processing operations but in many cases operations can be generalized to multidimensional or multichannel signals. Analog signals are defined continuously over time, while digital signals are sampled at discrete time intervals to provide a relatively compact function, suitable for storage on a CD, for instance, defined only at regularly demarcated intervals of time. The accrued variables over time provide a discrete-time signal that is an approximation of the actual non-discrete analog signal. This discreteness is the basis of a digital signal. If time is unbounded and the signal comprises all possible values, a continuous-valued signal results. The method for converting a continuous-valued signal into a discrete time value is known as sampling. Sampling requires quantization and quantization implies error. Quantization and sampling are thus an approximation process.

Discreteness is typically established in order to perform digital signal processing. The issue of deterministic versus random signals is based on the ability to mathematically predict output values of a signal function at a specific time given a certain number of previous outputs of the function. These predictions are the basis of functions that can replicate a given signal for reproduction purposes. When such predictions are mathematically too complicated or are not reasonably accurate, statistical techniques may be used to describe the probabalistic characteristics of the signal. In many real world applications, however, determinations of whether a signal, or part of a signal, is indeed random or not is difficult at best. The watermark systems described in earlier disclosures mentioned above have a basis in analyzing signals so that analysis of discrete time frames can be made to insert information into the signal being watermarked. When signal characteristics are measured, a key factor in securely encoding digital watermarks is the ability to encode data into a carrier signal in a way that mimics randomness or pseudo randomness so that unauthorized attempts at erasing the watermark necessarily require damage to the content signal. Any randomness that exists as a part of the signal, however, should be estimated in order that a party seeking to optimally watermark the input signal can determine the best location for watermark information and to make any subsequent analysis to determine the location of said watermarks more difficult. Again, typical implementations of signal processing that use z-transforms seek to describe what parts of the signal are deterministic so that they may be described as a compact, predictable function so that the signal maybe faithfully reproduced. This is the basis for so-called linear predictive coding techniques used for compression. The present invention is concerned with descriptions of the signal to better define just what parts of the signal are random so that digital watermarks may be inserted in a manner that would make them more or less tamperproof without damage to the carrier signal. Additional goals of the system are dynamic analysis of a signal at discrete time intervals so that watermarks may be dynamically adjusted to the needs of users in such instances as on-the-fly encoding of watermarks or distribution via transmission media (telephone, cable, electric powerlines, wireless, etc.)

Signal characteristics, if they can be reasonably defined, are also important clues as to what portion or portions of a given signal comprise the "aesthetically valuable" output signal commonly known as music or video. As such, perceptual coding or linear predictive coding is a means to accurately reproduce a signal, with significant compression, in a manner that perfectly replicates the original signal (lossless compression) or nearly replicates the signal (lossy compression). One tool to make better evaluations of the underlying signal includes the class of linear time-invariant (LTI) systems. As pointed out in Digital Signal Processing (Principles, Algorithms, and Applications), 3rd Ed. (Proakis and Manolakis), (also Practical DSP Modeling, Techniques, and Programming in C by Don Morgan) the z-transform makes possible analysis of a continuous-time signal in the same manner as discrete-time signals because of the relationship between "the convolution of two time domain signals is equivalent to multiplication of their corresponding z-transforms." It should be clear that characterization and analysis of LTI systems is useful in digital signal processing; meaning DSP can use a z-transform and invert the z-transform to deterministically summarize and recreate a signal's time domain representation. Z-transforms can thus be used as a mathematical way in which to describe a signal's time domain representation where that signal may not be readily processed by means of a Fourier transform. A goal of the present invention is to use such analysis so as to describe optimal locations for watermarks in signals which typically have components both of deterministic and non-deterministic (predictable and unpredictable, respectively) nature. Such insertion would inherently benefit a system seeking to insert digital watermarks, that contain sensitive information such as copyrights, distribution agreements, marketing information, bandwidth rights, more general "neighboring rights," and the like, in locations in the signal which are not easily accessible to unauthorized parties and which cannot be removed without damaging the signal. Such a technique for determining watermark location will help ensure "pirates" must damage the content in attempts at removal, the price paid without a legitimate "key."

Some discussion of proposed systems for frequency-based encoding of "digital watermarks" is necessary to differentiate the antecedents of the present invention which processes signals frame-by-frame and may insert information into frequencies without requiring the resulting watermark to be continuous throughout the entire clip of the signal. U.S. Pat. No. 5,319,735 to Preuss et al. discusses a spread spectrum method that would allow for jamming via overencoding of a "watermarked" frequency range and is severely limited in the amount of data that can be encoded—

4.3 8-bit symbols per second. Randomization attacks will not result in audible artifacts in the carrier signal, or degradation of the content as the information signal is sub-audible due to frequency masking. Decoding can be broken by a slight change in the playback speed. It is important to note the difference in application between spread spectrum in military field use for protection of real-time radio signals versus encoding information into static audio files. In the protection of real-time communications, spread spectrum has anti-jam features since information is sent over several channels at once, and in order to jam the signal, you have to jam all channels, including your own. In a static audio file, however, an attacker has all the time and processing power in the world to randomize each sub-channel in the signaling band with no penalty to themselves, so the anti-jam features of spread spectrum do not extend to this domain if the encoding is sub-audible. Choosing where to encode in a super-audible range of the frequency, as is possible with the present invention's antecedents, can better be accomplished by computing the z-transforms of the underlying content signal, in order to ascertain the suitability of particular locations in the signal for watermark information.

Instead of putting a single subaudible, digital signature in a sub-band as is further proposed by such entities as NEC, IBM, Digimarc, and MIT Media Lab, the antecedent inventions' improvement is its emphasis on frame-based encoding that can result in the decoding of watermarks from clips of the original full signal (10 seconds, say, of a 3 minute song). With signatures described in MIT's PixelTag or Digimarc/NEC proposals, clipping of the "carrier signal" (presently only based on results from tests on images, not video or audio signals which have time domains), results in clipping of the underlying watermark. Additionally, the present invention improves on previous implementations by providing an alternative computational medium to time/amplitude or frequency/energy domain (Fourier Transform) calculations and providing an additional measure by which to distinguish parts of a signal which are better suited to preserve watermarks through various DSP operations and force damage when attempts at erasure of the watermarks are undertaken. Further, the necessity of archiving or putting in escrow a master copy for comparison with suspect derivative copies would be unnecessary with the present invention and its proposed antecedents. Further, statistical techniques, not mathematical formulas, that are used to determine a "match" of a clip of a carrier signal to the original signal, both uneconomical and unreasonable, would not be necessary to establish ownership or other information about the suspect clip. Even if such techniques or stochastic processes are used, as in an audio spread-spectrum-based watermarking system being proposed by Thorn-EMI's CRL, called ICE, the further inability to decode a text file or other similar file that has been encoded using a watermark system as previously disclosed by above-mentioned U.S. patent applications including "Steganographic Method and Device", "Method for Human-Assisted Random Key Generation and Application for Digital Watermark System", "Method for Stega-cipher Protection of Computer Code", and "Optimal Methods for the Insertion, Protection and Detection of Digital Watermarks in Digitized Data", where all "watermark information" resides in the derivative copy of a carrier signal and its clips (if there has been clipping), would seem archaic and fail to suit the needs of artists, content creators, broadcasters, distributors, and their agents. Indeed, reports are that decoding untampered watermarks with ICE in an audio file experience "statistical" error rates as high as 40%. This is a poor form of "authentication" and fails to establish more clearly "rights" or ownership over a given derivative copy. Human listening tests would appear a better means of authentication versus such "probabalistic determination". This would be especially true if such systems contain no provision to prevent purely random false-positive results, as is probable, with "spread spectrum" or similar "embedded signaling"-type "watermarks," or actually, with a better definition, frequency-based, digital signatures.

SUMMARY OF THE INVENTION

The present invention relates to a method of using z-transform calculations to encode (and/or decode) independent data (e.g., digital watermark data) to a digital sample stream.

The present invention additionally relates to a method of analyzing deterministic and non-deterministic components of a signal comprised of a digital sample stream. Carrier signal independent data is encoded in the digital sample stream and encoding of the carrier signal independent data is implemented in a manner such that it is restricted to or concentrated primarily in the non-deterministic signal components of the carrier signal. The signal components can include a discrete series of digital samples and/or a discrete series of frequency sub-bands of the carrier signal.

The present invention additionally relates to a method of using z-transform calculations to measure a desirability of particular locations of a sample stream in which to encode carrier signal independent data. The desirability includes a difficulty in predicting a component of the sample stream at a given location which can be measured by the error function. The component and location may be comprised of information regarding at least one of the following: wave, amplitude, frequency, band energy, and phase energy. The present invention additionally relates to a method of encoding digital watermarks at varying locations in a sample stream with varying envelope parameters.

The present invention additionally relates to a method of using z-transform calculations to determine portions of a signal which may be successfully compressed or eliminated using certain processing techniques, without adverse impact on signal quality.

The present invention additionally relates to a method of encoding a digital watermark into a digital sample stream such that the watermark information is carried entirely in the most non-deterministic portions of the signal.

DETAILED DESCRIPTION

The Z-transform is a way of describing the characteristics of a signal. It is an alternative to time/amplitude and frequency/energy domain measures which expresses an estimate of periodic components of a discrete signal. In a digital signal processing environment, a sampling theorem, known specifically as the Nyquist Theorem, proves that band limited signals can be sampled, stored, processed, transmitted, reconstructed, desampled or processed as discrete values. For the theorem to hold, the sampling must be done at a frequency that is twice the frequency of the highest signal frequency one seeks to capture and reproduce. The time and frequency domains are thus implicitly important in developing functions that can accurately replicate a signal. In a third domain, the z-transform enables analysis of the periodic nature of discrete-time signals (and linear time-invariant systems) much as the Laplace transform plays a role in the analysis of continuous-time signals (and linear time-invariant systems). The difference is that the z-transform expresses results on the so-called z-plane, an imaginary mathematical construct which may be thought of as a Cartesian coordinate system with one axis replaced by imaginary numbers (numbers expressed in relation to the square root of −1). This may allow manipulations of signals which are not possible with Fourier Transform analyses (the frequency/energy domain). At the least, the z-transform is an alternative way to represent a signal. The imaginary number axis serves as a representation of the phase of the signal, where the phase oscillates through an ordered, bounded set of values over a potentially infinite series of discrete time values. Phase is the framework for representing the periodic nature of the signal. This third method of describing a discrete-time signal has the property of equating the convolution of two time-domain signals in the result of the multiplication of those signals' corresponding z-transforms. By inverting a z-transform, the time-domain representation of the signal may be approximately or wholly reconstructed.

To better define the z-transform, it is a power series of a discrete-time signal and is mathematically described hence:

$$X(z) = \sum_{n=-\infty}^{\infty} x(n) z^{-n}$$

where,
x(n) is a discrete-time signal
X(z) is a complex plane representation
z is a complex variable Because the z-transform is an infinite power series, a region of convergence (ROC) is the set of all values of z where X(z) has a finite value, in other words, this is where the series has a computable value. Conversely, nonconvergence would mean randomness of the signal.

Where z=0 or z=∞, the series is unbounded and thus the z-plane cannot be defined. What is required is a closed form expression that can only be described with a region of convergence (ROC) being specified. A coordinate in the imaginary z-plane can be interpreted to convey both amplitude and phase information. Phase is closely related to frequency information. Again, phase can be understood to oscillate at regular periods over infinite discrete time intervals, and is used to express information on the periodic nature of signals. Thus, as an alternative representation of a signal, the z-transform helps describe how a signal changes over time.

Some parameters of the region of convergence (ROC) necessitate the establishment of the duration (finite versus infinite) and whether the ROC is causal, anticasual, or two-sided. Special cases of signals include one that has an infinite duration on the right side, but not the left side; an infinite duration on the left side, but not the right side; and, one that has a finite duration on both the right and left sides—known, respectively, as right-sided, left-sided, and finite-duration two-sided. Additionally, in order to correctly obtain the time domain information of a signal from its z-transform, further analysis is done. When a signals z-transform is known the signal's sequence must be established to describe the time domain of the signal—a procedure known as inverse z-transform, Cauchy integral theorem is an inversion formula typically used. Properties of the z-transform will now be described so that those skilled in the art are able to understand the range of computations in which z-transforms may be used for watermark related calculations.

| Property | Time Domain | z-Domain | ROC |
|---|---|---|---|
| Notation | $x(n)$ | $X(z)$ | ROC: $r_2 < [z] < r_1$ |
|  | $x_1(n)$ | $X_1(z)$ | $ROC_1$ |
|  | $x_2(n)$ | $X_2(z)$ | $ROC_2$ |
| Linearity | $a_1 x_1(n) + a_2 x_2(n)$ | $a_1 X_1(z) + a_2 X_2(z)$ | At least the intersection of $ROC_1$ and $ROC_2$ |
| Time shifting | $X(n - k)$ | $z^{-k} X(Z)$ | That of X(z), except z = 0 if k > 0 nd = ∞ if k > 0 |
| Scaling in the z-domain | $a^n x(n)$ | $X(a^{-1} z)$ | $[a] r_2 < [z] < [a] r_1$ |
| Time reversal | $x(-n)$ | $X(z^{-1})$ | $1/r_1 < [z] < 1/r_2$ |
| Conjugation | $x^*(n)$ | $X^*(z^*)$ | ROC |
| Real Part | $Re\{x(n)\}$ | $1/2\{X(z) + X^*(z^*)\}$ | Includes ROC |
| Imaginary Pail | $Im\{x(n)\}$ | $1/2\{X(z) - X^*(z^*)\}$ | Includes ROC |
| Differential in the z-domain | $nx(n)$ | $-z(-z((dX(z)/(dz))\}$ | $r_2 < [z] < r_1$ |
| Convolution | $(x_1(n)) * (x_2(n))$ | $X_1(z) X_2(z)$ | At least the intersection of $ROC_1$ and $ROC_2$ |
| Correlation | $rx_1 x_2(1) = x_1(1) * x_2(-1)$ | $Rx_1 x_2(z) = X_1(z) X_2(z^{-1})$ | At least the intersection of ROC of $X_1(z)$ and $X_2(z^{-1})$ |
| Initial value theorem | If x(n) causal | $x(0) = \lim X(z)$ |  |
| Multiplication | $x_1(n) x_2(n)$ | $1/2\pi j \left\{ \int_{z\, to\infty}^{z\, to\infty} X_1(v) X_2((z/v) v^{-1} dv \right\}$ | At least $r_{1l} r_{2l} < [z] < r_{1u} r_{2u}$ |
| Parseval's relation | $\sum_{n=-\infty}^{\infty} X_1(n) X_2^*(n) = 1/2\pi j \left\{ \int X_1(v) X_2^*((1/v^*) v^{-1} dv \right\}$ |  |  |

Note:
"[ ]" denote absolute values; For "Multiplication" and "Parseval's relation" the "∫" is for "0$_c$," a circle in the ROC. From Digital Signal Processing (Principles, Algorithms, and Applications) - 3rd Ed. Proakis & Manolakis The inversion of the z-transform with three methods further described, in Digital Signal Processing (Principles, Algorithms, and Applications)—3rd Ed. Proakis & Manolakis, as 1) Direct evaluation by contour integration 2) Expansion into a series of terms, in the variables z, and $z^{-1}$ and 3) Partial-fraction expansion and table lookup. Typically the Cauchy theorem is used for direct evaluation. In determining causality, LTI systems are well-suited in establishing the predictability of time-domain characteristics with pole-zero locations. For applications of digital watermarks as described in the present invention the importance of both alternatively describing a signal and establishing deterministic characteristics of the signal's components is clear to those skilled in the art. Placing watermarks in the "random" parts of a signal, those that are difficult to predict and thereby compress, would enhance the security from attacks by pirates seeking to identify the location of said watermarks or erase them without knowing their specific location. Use of z-transforms to establish a more secure "envelope" for watermark insertion works to the advantage of those seeking to prevent such attacks. Similarly, creation of linear predictive coding filters is an excellent example that benefits from preanalysis of content signals prior to the insertion of watermarks.

This is an extension of the application of optimal filter design for applications for frame-based watermark systems as described in the above-mentioned patent applications entitled "STEGANOGRAPHIC METHOD AND DEVICE", "METHOD FOR HUMAN-ASSISTED RANDOM KEY GENERATION AND APPLICATION FOR DIGITAL WATERMARK SYSTEM", and "METHOD FOR STEGA-CIPHER PROTECTION OF COMPUTER CODE", "OPTIMAL METHODS FOR THE INSERTION, PROTECTION AND DETECTION OF DIGITAL WATERMARKS IN DIGITIZED DATA". Recursive digital filters are efficient for applications dependent on previous inputs and outputs and current inputs at a given time—a dynamic filter. The z-transform makes possible high performance of time domain digital filtering with implementation of recursive filters where signal characteristics are efficiently identified.

In one embodiment of the present invention, z-transform calculations are performed as an intermediate processing step, prior to the actual encoding of a digital watermark into a sample stream. The Argent™ digital watermark software, developed by The DICE Company, for example, uses a modular architecture which allows access to the sample stream and related watermark data at various stages of computation, and further allows modules to pass their results on (or back) to other modules. Z-transform calculations can be integrated into this processing architecture either directly in the CODEC module, which is responsible for encoding information to a series of samples, or decoding it from them, or as a FILTER module, which provides other modules with information on how specific types of filters will affect the sample stream. During processing, a series of sample frames are separated into groupings called "windows". Typically the groupings are comprised of contiguous series of samples, but this need not be the case. Any logical arrangement might be handled. Each sample window comprises a finite duration two-sided signal, a special case for z-transform calculations discussed above.

Each window may then be fed to a z-transform calculator (in a FILTER or CODEC module) which derives phase composition information from the signal using a z-transform algorithm. This information summarizes estimates of any regular phase components of the signal. Note that windows may be dynamically adjusted to be longer or shorter duration, or they may be computed in an overlapping fashion, with information about adjacent windows and their z-transforms being considered with regard to the current transform. Windows might have weightings applied to sample frames in order to emphasize some portions or de-emphasize others. Using these additional modifications may help to smooth discontinuities between window calculations and provide a better average estimate over longer portions of a signal.

The resulting z-transform information could be visualized by placing points of varying brightness or color (which corresponds to an amplitude) on the unit circle in the complex z-plane (the circle centered at z=0.0, 0.0 with radius 1). These points symbolize recurrent signal components at particular phases (where phase is determined by the angle of the line drawn between the point on the perimeter of the circle and its center). A deterministic approximation of the signal could then be reconstructed with all possible times represented by multiplying phase by the number of revolutions about the circle. Positive angle increments move forward in time, while negative increments move backward. The phase components yielded by the z-transform are then used to summarize and reproduce an estimate of the deterministic portion of the signal. Typically one may invert the z-transform calculations to produce this estimate in terms of a series of wave amplitude samples. By calculating the error rate and location of such errors in the estimated signal versus the original, the system can determine exactly where a signal is "most non-deterministic," which would constitute promising locations within the sample stream to encode watermark information. Note that location could be construed to mean any combination of sample, frequency or phase information.

The process described above is, in principle, an inversion of the type of process used for Linear Predictive Coding (LPC) and is a general example of "filter inversion" for optimal watermark planning. The type calculations are performed in order to determine what parts of the signal will survive the LPC process intact, and are thus good places to place watermarks which are to survive LPC. In LPC, the deterministic portion of a signal is compressed and the non-deterministic portion is either preserved as a whole with lossless compression or stochastically summarized and recreated randomly each time the "signal" is played back.

What is claimed is:

1. A method for extracting a digital watermark from a content signal, comprising
    a) receiving a content signal;
    b) using linear predictive coding calculations to identify predictable and unpredictable components of said content signal, said unpredictable signal components being characterized by at least one of the following groups:
        i) a discrete series of digital samples, and
        ii) a discrete series of carrier frequency sub-bands of the content signal; and
    c) extracting the digital watermark from the unpredictable signal components of the content signal.

2. The method of claim 1, wherein the content signal is an analog waveform.

3. The method of claim 1, where the signal components are non-contiguous.

4. The method of claim 1, where the content signal may first be decompressed before using linear predictive coding to identify signal components.

5. The method of claim 1, where the location of at least a portion of the digital watermark is represented by at least one of the following: sample, frequency, phase or combinations thereof.

6. The method of claim 1, wherein the step of extracting comprises:
   extracting the digital watermark based on one or more locations within said unpredictable signal components.

7. The method of claim 1, wherein the signal components are identified using at least one of the following characteristics of the content signal: wave, amplitude, frequency, band energy, and phase energy.

8. The method of claim 1, where the linear predictive coding calculations enables compression of the predictable signal components and at least one of the following: preservation of the unpredictable signal components or stochastic representation of the unpredictable signal components.

9. The method of claim 1, where the digital watermark is accessible with a key.

10. A method for extracting a digital watermark from a content signal, comprising
   a) receiving a content signal;
   b) using linear predictive coding calculations to identify predictable and unpredictable components of said content signal, said predictable signal components being characterized by at least one of the following group:
      i) a discrete series of digital samples, and
      ii) a discrete series of carrier frequency sub-bands of the content signal; and
   c) extracting the digital watermark from the predictable signal components of the content signal.

11. The method of claim 10, wherein the content signal is an analog waveform.

12. The method of claim 10, where the signal components are non-contiguous.

13. The method of claim 10, where the content signal may first be decompressed before using linear predictive coding to identify signal components.

14. The method of claim 10, where the location of at least a portion of the digital watermark is represented by at least one of the following: sample, frequency, phase or combinations thereof.

15. The method of claim 10, wherein the step of extracting comprises:
   extracting the digital watermark based on one or more locations within said predictable signal components.

16. The method of claim 10, wherein the signal components are identified using at least one of the following characteristics of the content signal: wave, amplitude, frequency, band energy, and phase energy.

17. The method of claim 10, where the linear predictive coding calculations enables compression of the predictable signal components and at least one of the following: preservation of the unpredictable signal components or stochastic representation of the unpredictable signal components.

18. A method of using linear predictive coding calculations to measure the desirability of particular locations in a sample stream in which to encode content signal independent data, including a digital watermark, comprising:
   receiving a sample stream;
   using linear predictive coding calculations to identify locations in said sample stream which would be desirable for encoding content signal independent data; and
   encoding said content signal independent data into said identified locations in said sample stream to produce an embedded sample stream.

19. The method of claim 18, where the embedded sample stream is an arbitrarily close approximation of the sample stream.

20. the method of claim 18, where the content signal independent data is accessible with a key.

\* \* \* \* \*